United States Patent
Van Bosch et al.

(10) Patent No.: US 9,385,789 B1
(45) Date of Patent: Jul. 5, 2016

(54) ADD-ON NFC ANTENNA ARCHITECTURE

(71) Applicant: Motorola Mobility LLC, Chicago, IL (US)

(72) Inventors: James A Van Bosch, Crystal Lake, IL (US); Pavel Shostak, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/742,753

(22) Filed: Jun. 18, 2015

(51) Int. Cl.
*H04B 5/00* (2006.01)

(52) U.S. Cl.
CPC .................................. *H04B 5/0081* (2013.01)

(58) Field of Classification Search
CPC .. H04B 5/0025; H04B 5/0031; H04B 5/0075; H04B 5/0081; H04B 5/0087; H04B 5/02
See application file for complete search history.

(56) References Cited

U.S. PATENT DOCUMENTS

| | | | |
|---|---|---|---|
| 2006/0160487 A1* | 7/2006 | Nam | H04M 1/7253 455/41.1 |
| 2015/0205990 A1* | 7/2015 | Younger | H04M 1/1753 340/10.1 |

* cited by examiner

*Primary Examiner* — Nguyen Vo

(57) ABSTRACT

A near field communication (NFC) system includes a portable device having an embedded NFC antenna, an add-on module blocking the embedded NFC coil and an NFC transfer coil wrapped around the add-on module to eliminate blocking of the embedded NFC antenna. A predetermined set of NFC antenna tuning parameters is associated with each add-on module and is applied by the device's NFC controller upon identifying the docked add-on module. In an embodiment, the NFC transfer coil includes linked first and second NFC coils which replicate NFC signals in each other. The NFC transfer coil may include a ferrite shield between each of the linked NFC coils and the add-on module to minimize the creation of eddy currents that may degrade the performance of the embedded NFC antenna.

20 Claims, 7 Drawing Sheets

ADD-ON NFC ANTENNA ARCHITECTURE

TECHNICAL FIELD

The present disclosure is related generally to mobile communication devices, and, more particularly, to a system and method for transmission and receipt of Near Field Communication (NFC) signals from and to a modular portable communication device.

BACKGROUND

Current NFC technologies encompass a group of short-range wireless technologies that operate over a distance of approximately 4 cm. NFC allows the sharing of small amounts of data between an NFC tag and a device or between two devices. Tags may be found in ID cards, on products and in other environments where a small amount of data needs to be exchanged. For example, an NFC ID card may convey a user's ID information. NFC tags may support read and write functions, programming functions, mathematical operations and other features. Complex tags even support the running of code on the tag itself.

An NFC-enabled device may read from and write to NFC tags. The device is also able to exchange data with peer devices. In some cases, an NFC-enabled device is able to emulate an NFC tag, such as for ID or purchase operations. Because NFC technology requires close proximity between the NFC-enabled device and an NFC tag or other NFC-enabled device, the NFC antenna in such devices is placed close to the device surface, e.g., just under the back surface.

Unfortunately, if another item or object such as a battery pack is placed against the device over the internal (or "embedded") NFC antenna, the internal NFC antenna may be effectively prevented from sending or receiving any communications. Nonetheless, the inventors have found that it would be beneficial to support NFC communications while also allowing add-on modules in a portable communication device such as a cellular phone.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize any item of prior art.

As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a comprehensive discussion of the disclosed principles, an overview is given to aid the reader in understanding the later discussion. As noted above, certain portable electronic devices may be configured to allow the docking of various accessories or add-on modules to the back of the device. Such add-on modules may include, for example, an extended battery module, an enhanced audio module and others. However, upon being docked to the back of the device, an add-on module will obscure the field of the internal NFC antenna. Such interference may degrade the device's NFC functions or, in the worst case, preclude such functions entirely.

In an embodiment of the disclosed principles, an NFC transfer coil is provided for use with add-on modules to eliminate NFC antenna blocking. An NFC controller includes a unique set of NFC antenna tuning parameters for each NFC transfer coil. An appropriate NFC transfer coil is mounted to an add-on module before the add-on module is docked to the back of the device. Upon the add-on module being docked to the device, the NFC controller resolves the unique ID of the module being attached and applies a predetermined set of NFC antenna tuning parameters associated with the particular add-on module.

In an embodiment, the NFC transfer coil is a structure having linked first and second NFC coils which replicate the signals in each other. For example, an incoming NFC transmission can be received by the first NFC coil and re-radiated by the second NFC coil to the embedded device NFC coil.

In a further embodiment, the NFC transfer coil includes a ferrite shield between each of the linked first and second NFC coils and the add-on module itself. This minimizes the creation of eddy currents in the module and other metal surfaces that would otherwise degrade the received and re-radiated magnetic field. As noted above, the two coils in the NFC transfer coil are linked.

Discrete components may be added to the NFC transfer coil for additional tuning to improve performance. In addition, the device-facing coil in the NFC transfer coil may be essentially the same size and configuration as the embedded NFC coil of the device, but transposed to optimize coupling between the embedded NFC coil and the NFC transfer coil.

With this overview in mind, and turning now to a more detailed discussion in conjunction with the attached figures, the techniques of the present disclosure are illustrated as being implemented in a suitable computing environment such as a portable electronic communication device. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
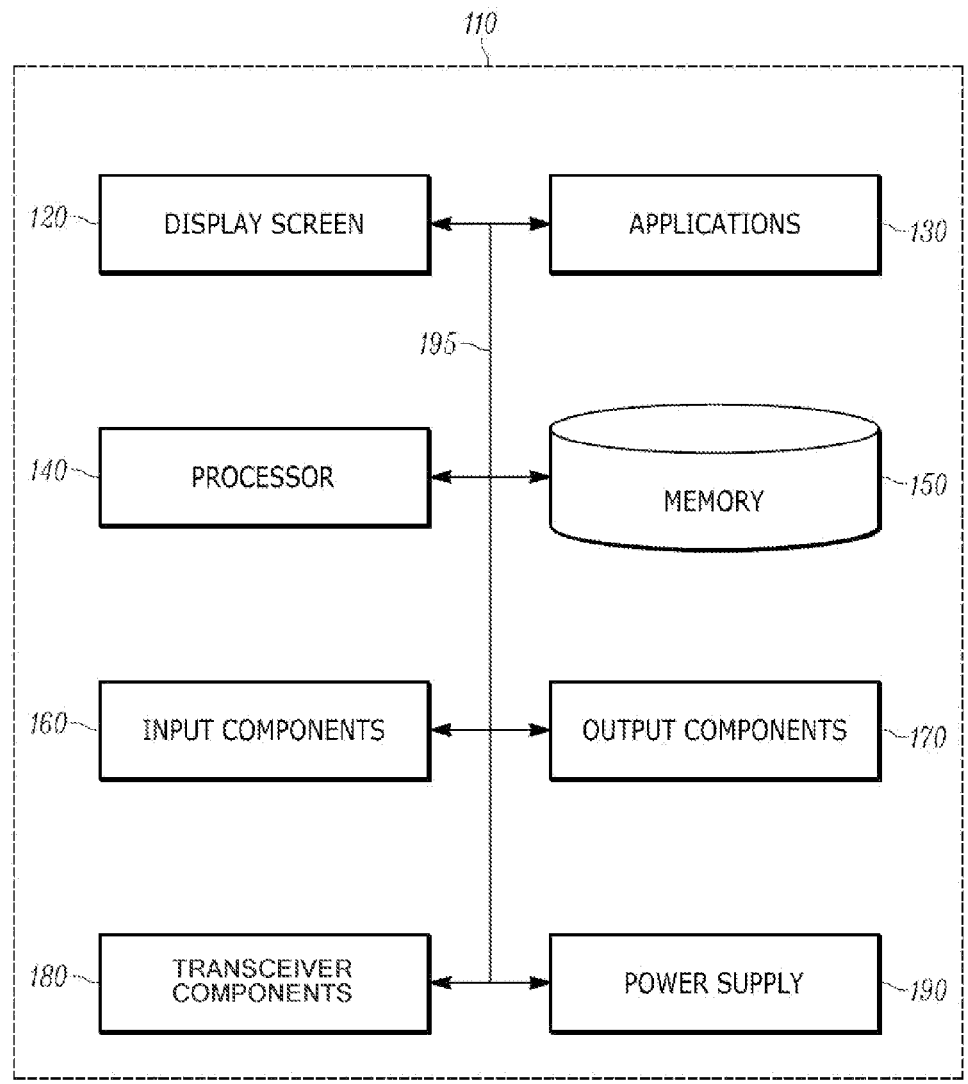
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers. The processor 140 may be any of a microprocessor, microcomputer, application-specific integrated circuit, or the like. For example, the processor 140 can be implemented by one or more microprocessors or controllers from any desired family or manufacturer.

Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRAM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications provide standard or required functionality of the user device 110, some applications may provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, the component group 110 includes software and hardware transceiver components 180 to allow communications to and from the device. Such transceiver components 180 will typically provide wireless networking functionality, although wired networking may additionally or alternatively be supported. The transceiver components 180 include an NFC antenna to allow near field communications with NFC tags or peer devices. In addition, the transceiver components 180 may include cellular components, Wi-Fi components and Bluetooth components.

The device may include a power supply 190, such as a battery or fuel cell, for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
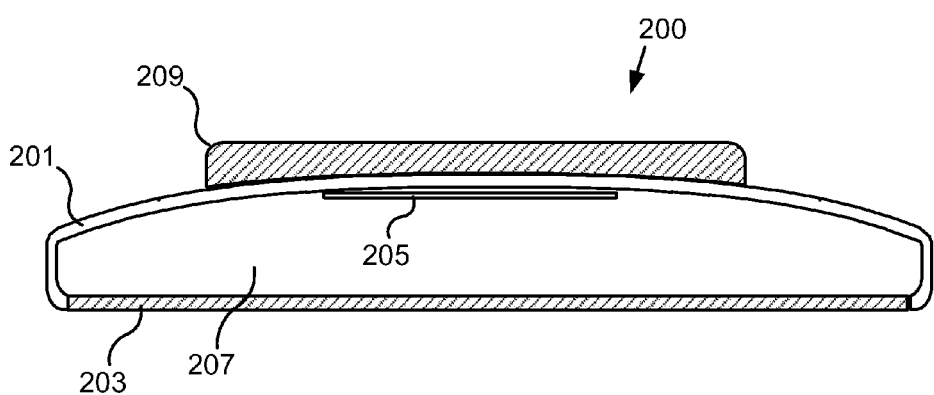
FIG. 2 is a cross-sectional end view of a device within which an embodiment of the disclosed principles may be implemented.

Turning to FIG. 2, this figure presents a cross-sectional end view of a device within which an embodiment of the disclosed principles may be implemented. In particular, the external surface of the device 200 comprises a device case 201 and a display 203. The display 203 may be, for example, the display screen 120 of FIG. 1. The device case 201 is made of a nonmagnetic material or includes a nonmagnetic portion over an embedded NFC antenna 205. The internal cavity 207 defined by the display 203 and the device case 201 includes multiple standard elements such as those described with respect to FIG. 1, but such elements are omitted from FIG. 2 for clarity.

An add-on module 209 is shown docked to the back of the device 200. As discussed above, the add-on module extends the device by adding a resource (e.g., battery power) or function (e.g., enhanced audio). As can be seen, the add-on module 209 overlies the embedded NFC antenna 205 when in the docked configuration, occluding the embedded NFC antenna 205 and preventing effective NFC communications. Moreover, docking the add-on module 209 to the front of the device 200 rather than to the rear of the device 200 is not practical, since the front surface of the device is largely dedicated to the display 203.

In an embodiment, the embedded NFC antenna 205 is enabled while still allowing docking of the add-on module 209 to the back of the device 200. More specifically, an NFC transfer coil is configured and located to feed NFC signals around the add-on module 209. This embodiment is shown in FIG. 3, which is a cross-sectional end view of a device such as that shown in FIG. 2, wherein an NFC transfer coil 300 has been added.

As shown in the figure, the NFC transfer coil 300 wraps the add-on module 209 such that there is a device-facing portion 301 of the NFC transfer coil 300 and an outwardly facing portion 303 of the NFC transfer coil 300. The device-facing portion 301 and the outwardly facing portion 303 of the NFC transfer coil 300 are linked by a lead portion 305 which physically and electrically connects the two portions 301, 303.

In use, the device-facing portion 301 of the NFC transfer coil 300 interfaces with the embedded NFC antenna 205 of the device 200, while the outwardly facing portion 303 interfaces with the device-facing portion 301 and external NFC tags or devices. In this way, outgoing NFC signals and incoming NFC signals are routed around the obstruction, i.e., the add-on module 209. In an embodiment, the NFC transfer coil 300 includes one or more ferrite shields, as will be discussed in greater detail below.

Figure 3:
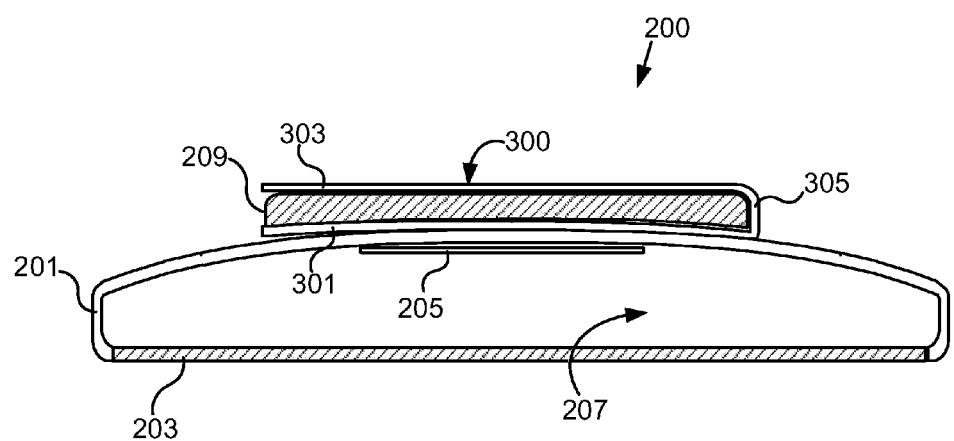
FIG. 3 is a cross-sectional end view of the device shown in FIG. 2, wherein an NFC transfer coil has been added to a docked add-on module.
Figure 4:
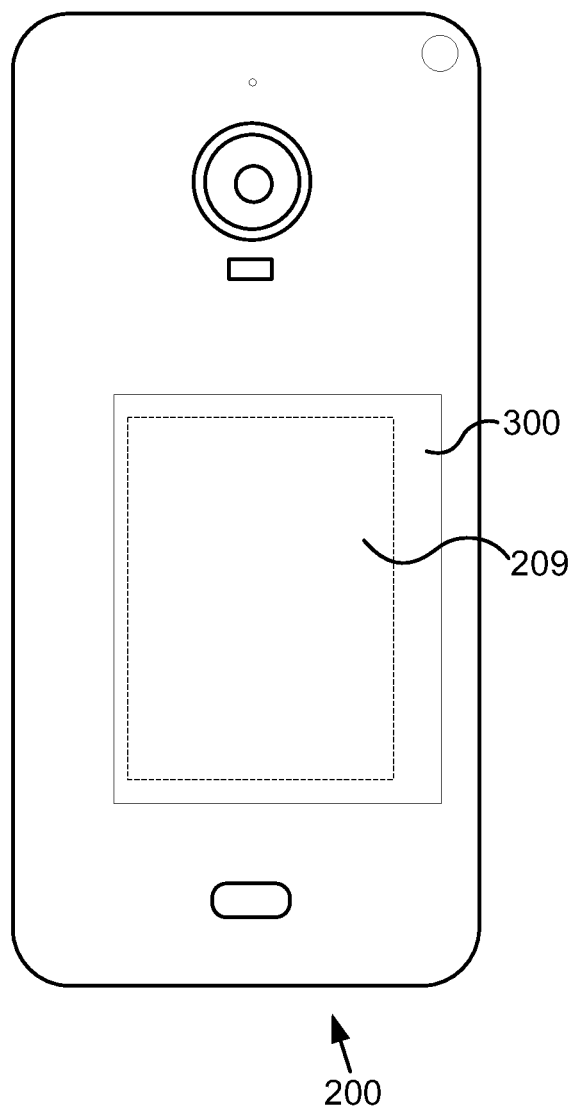
FIG. 4 is a back view of a device including a wrapped add-on module in keeping with an embodiment of the disclosed principles.

Turning to FIG. 4, this figure shows a back view of the portable electronic device 200 of FIG. 3. As can be seen, the outward-facing portion 303 of the NFC transfer coil 300 covers the add-on module 209 (shown in dashed outline). It will be appreciated, though not visible in this view, that beneath the add-on module 209, the device-facing portion 301 of the NFC transfer coil 300 overlies the device's embedded NFC antenna 205. In the illustrated configuration, the outward-facing portion 303 of the NFC transfer coil 300 transfers all incoming NFC signals to the embedded NFC antenna 205 via the device-facing portion 301 of the NFC transfer coil 300. Similarly, the outward-facing portion 303 of the NFC transfer coil 300 also receives all outgoing NFC signals from the embedded NFC antenna 205 via the device-facing portion 301.

Figure 5:
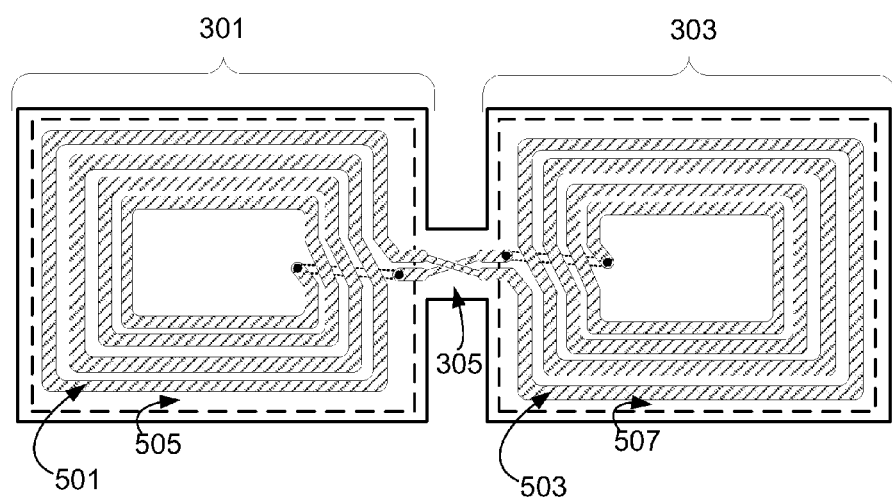
FIG. 5 is a plan view of an NFC transfer coil in accordance with an embodiment of the disclosed principles.

As noted above, a ferrite shield is associated with each of the device-facing and outward-facing portions 301, 303 of the NFC transfer coil 300 in an embodiment of the disclosed principles. These shields are more clearly visible in FIG. 5, which is a plan view of an NFC transfer coil in accordance with this embodiment.

Figure 6:
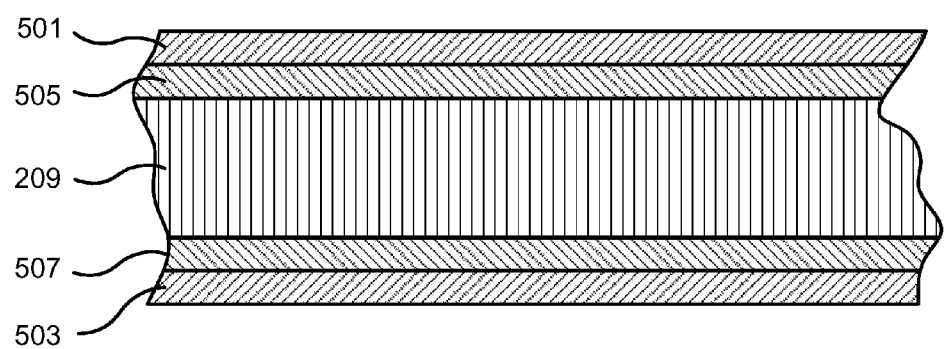
FIG. 6 is a schematic cross-sectional view of a layered structure including NFC transfer coil components and an add-on module in accordance with an embodiment of the disclosed principles.

In the illustrated embodiment, the device-facing and outward-facing portions 301, 303 of the NFC transfer coil 300 contain first and second NFC coils 501, 503 respectively. First and second ferrite shields 505, 507 are located over each coil 501, 503, although the ferrite shields 505, 507 are shown in dashed outline in the figure to allow observation of the underlying structures. As can be seen, the outer leads of the coils 501, 502 are wired together and the inner leads are also wired together. The linking leads may be soldered wiring flexible circuit elements or portions of the coils 501, 503, themselves. In the illustrated configuration, when the NFC transfer coil 300 is wrapped around the add-on module 209, the resulting structure is a layered structure as shown in greater detail in the schematic cross-sectional view of FIG. 6.

The wrapped structure includes, in order, the first NFC coil 501 in the outward-facing portion 303 of the NFC transfer coil 300, the first ferrite shield 505, the add-on module 209, the second ferrite shield 507, and the second NFC coil 503 in the device-facing portion 303 of the NFC transfer coil 300. In this way, the device's embedded coil 205 is able to emit and receive NFC signals despite the presence of the add-on module 209.

Rather than modify the coils 501, 503 of the NFC transfer coil 300 for each type of add-on module, discrete components may be added to the NFC transfer coil 300 to tune it for different required responses. An example of this is to add appropriately sized capacitors to the coils. In an embodiment, this entails placing a capacitor in series with the outer leads of the coils 501, 503 and another in series with the inner leads of the coils 501, 503.

As will be appreciated by those of skill in the art, the capacitor values affect the tuning of the circuit, allowing a better match and better coupling to the device's embedded coil. The embedded coil 205 of the device 200 is also tunable, allowing the device processor to optimize the device's NFC characteristics based on the identity and associated predetermined characteristics of the add-on module.

Figure 7:
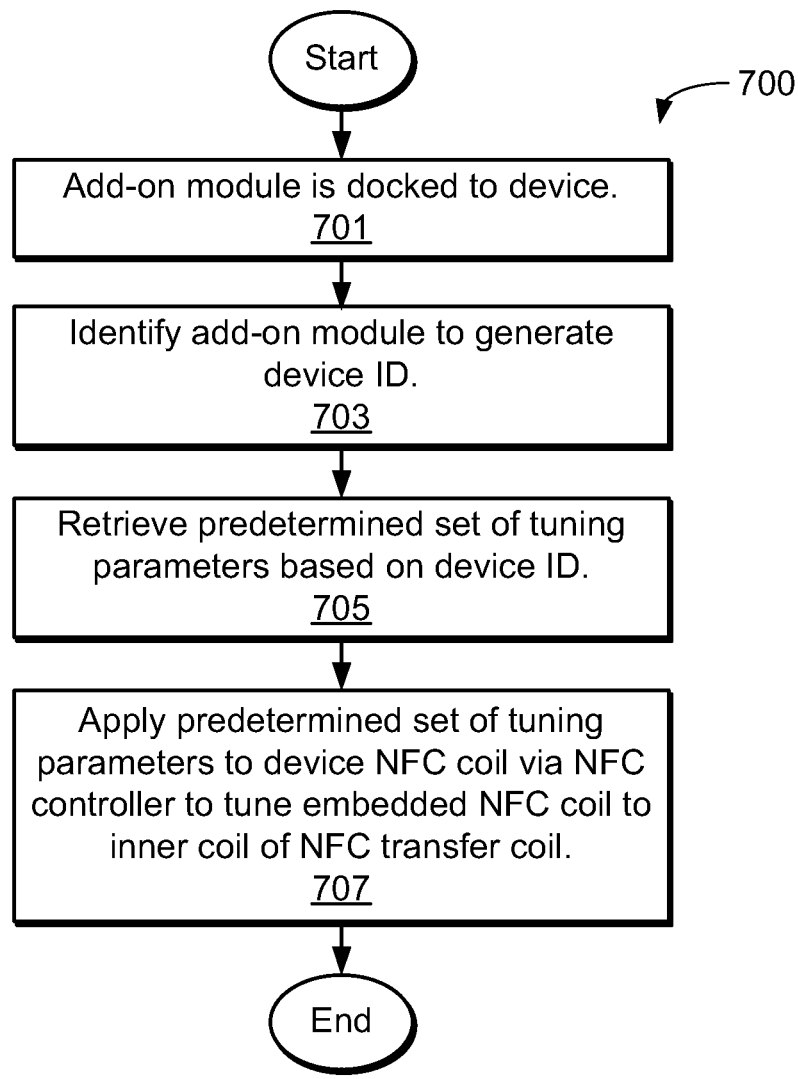
FIG. 7 is a flowchart showing a process in accordance with an embodiment of the disclosed principles.

Although methods of employing the disclosed principles may vary, an exemplary method is shown in the flow chart of FIG. 7. At stage 701 of the process 700, an add-on module is docked to device 200. The processor of the device 200 identifies the add-on module at stage 703, e.g., via the connection of the add-on module to the device 200. In this regard, the add-on module connects electrically to the device 200 when docked in order to execute its function in concert with the device 200.

For example, if the add-on module is an extended audio module, then there is an electrical connection to the device allowing the module to receive audio data; this same connection or an associated connection made at the same time will allow ID information to be transmitted from the module to the device. Similarly, if the add-on module is an extended photography module, the electrical connection made upon docking allows for control of the module by the device and for transmission of image data back to the device 200.

Returning to the process 700, the processor of the device 200 identifies a predetermined set of tuning parameters at stage 705 based on the resolved device identification, e.g., via a lookup table or other means. At stage 707, the processor of the device 200 programs these tuning parameters into an NFC Controller which in turn applies the predetermined set of tuning parameters to the embedded NFC coil 205. This optimizes the coupling of the embedded NFC coil 205 to the inner coil 501 of the NFC transfer coil 300 in the presence of the identified add-on module. In this way, the embedded NFC coil 205 can effectively send and receive NFC signals despite the presence of the add-on module over the coil 205.

It will be appreciated that systems and methods for facilitating NFC communications in the presence of an add-on module have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable device near field communication (NFC) system comprising:
   an embedded NFC coil;
   an NFC controller; and
   a processor configured to detect docking of an add-on module to the device while the add-on module is wrapped in an NFC transfer coil, identify the add-on module, program predetermined NFC antenna tuning parameters into the NFC controller based on the identity of the add-on module, and tune the embedded NFC coil in keeping with the predetermined NFC antenna tuning parameters.

2. The system in accordance with claim 1, further comprising the NFC transfer coil.

3. The system in accordance with claim 2, wherein the NFC transfer coil comprises an inner NFC coil and an outer NFC coil configured such that the inner NFC coil lies between the add-on module and the device, and the outer NFC coil faces away from the add-on module and the device, when the add-on module is wrapped in the NFC transfer coil and docked to the device.

4. The system in accordance with claim 3, wherein the NFC transfer coil further comprises an inner ferrite shield associated with the inner NFC coil and an outer ferrite shield associated with the outer NFC coil.

5. The system in accordance with claim 4, wherein the inner ferrite shield lies between the inner NFC coil and the add-on module, and the outer ferrite shield lies between the outer NFC coil and the add-on module, when the add-on module is wrapped in the NFC transfer coil.

6. The system in accordance with claim 3, wherein the inner NFC coil and the outer NFC coil include a respective inner lead and outer lead, and wherein the inner lead is electrically connected to the outer lead.

7. The system in accordance with claim 6, wherein the NFC transfer coil further includes one or more discrete electrical components electrically connected to the NFC transfer coil to modify tuning of the NFC transfer coil.

8. The system in accordance with claim 3, wherein the inner NFC coil is substantially the same size as the embedded NFC coil, but transposed to optimize coupling between the embedded NFC coil and the inner NFC coil of the NFC transfer coil.

9. A portable device near field communication (NFC) system comprising:
   a portable electronic device having an embedded NFC coil;
   an add-on module attached to the portable electronic device near the embedded NFC coil; and
   an NFC transfer coil wrapped around the add-on module, the NFC transfer coil comprising an inner NFC coil and an outer NFC coil configured such that the inner NFC coil lies between the add-on module and the device and the outer NFC coil faces away from the add-on module and the device.

10. The system in accordance with claim 9, further comprising an NFC controller in the device configured to detect attachment of the NFC transfer coil-wrapped add-on module to the device, identify the add-on module, receive predetermined NFC antenna tuning parameters from a processor based on the identity of the add-on module, and tune the embedded NFC coil in keeping with the predetermined NFC antenna tuning parameters.

11. The system in accordance with claim 9, wherein the NFC transfer coil further comprises an inner ferrite shield associated with the inner NFC coil and an outer ferrite shield associated with the outer NFC coil.

12. The system in accordance with claim 11, wherein the inner ferrite shield lies between the inner NFC coil and the add-on module, and the outer ferrite shield lies between the outer NFC coil and the add-on module, when the NFC transfer coil is wrapped around the add-on module.

13. The system in accordance with claim 9, wherein the inner NFC coil and the outer NFC coil include a respective inner lead and outer lead, and wherein the inner lead is electrically connected to outer lead.

14. The system in accordance with claim 13, wherein the NFC transfer coil further includes one or more discrete electrical components electrically connected to the NFC transfer coil to modify tuning of the NFC transfer coil.

15. The system in accordance with claim 9, wherein the inner NFC coil is substantially the same size as the embedded NFC coil, but transposed to optimize coupling between the embedded NFC coil and the inner NFC coil.

16. A method for mounting an add-on module to a portable electronic device having an embedded near field communication (NFC) antenna without interfering with NFC capabilities of the device, the method comprising:
   wrapping the add-on module in an NFC transfer coil, the NFC transfer coil having an inner NFC coil on a first side of the add-on module and an outer NFC coil on a second side of the add-on module;
   docking the add-on module to the device with the first side of the add-on module toward the device;
   transmitting ID information from the add-on module to the device; and
   tuning the embedded NFC coil based on the ID information.

17. The method in accordance with claim 16, wherein the add-on device provides a resource to the device.

18. The method in accordance with claim 17, wherein the resource includes at least one of memory and electrical power.

19. The method in accordance with claim 16, wherein the add-on device provides a function to the device.

20. The method in accordance with claim 19, wherein the function includes at least one of a photography function and an audio function.

* * * * *